United States Patent [19]

Prutu

[11] Patent Number: 5,672,815
[45] Date of Patent: Sep. 30, 1997

[54] METHOD AND APPARATUS FOR MEASURING OUTSIDE DIMENSIONS AND THE CENTER OF GRAVITY OF A PACKAGE

[75] Inventor: Victor Nicolas Prutu, Bethel, Conn.

[73] Assignee: United Parcel Service of America, Inc., Atlanta, Ga.

[21] Appl. No.: 683,696

[22] Filed: Oct. 12, 1996

Related U.S. Application Data

[63] Continuation of Ser. No. 478,234, Jun. 7, 1995, abandoned.

[51] Int. Cl.$^6$ .................. G01N 1/00; G01N 1/16; G01N 1/38
[52] U.S. Cl. .................. 73/65.07; 73/65.01
[58] Field of Search ............... 73/65.01, 65.02, 73/65.05, 65.07, 65.09

[56] References Cited

U.S. PATENT DOCUMENTS

| | | |
|---|---|---|
| 3,198,513 | 8/1965 | Farez . |
| 3,210,989 | 10/1965 | Samborsky .................. 73/65.01 |
| 3,242,342 | 3/1966 | Gabar . |
| 3,435,667 | 4/1969 | Browning et al. . |
| 3,485,339 | 12/1969 | Miller et al. . |
| 3,513,444 | 5/1970 | Henderson et al. . |
| 3,515,254 | 6/1970 | Gary . |
| 4,419,384 | 12/1983 | Kane et al. . |
| 4,604,704 | 8/1986 | Eaves et al. . |
| 5,301,544 | 4/1994 | Smith . |
| 5,331,118 | 7/1994 | Jensen .................. 177/25.14 |
| 5,340,950 | 8/1994 | Brandorff et al. . |
| 5,408,054 | 4/1995 | Brandorff et al. . |

FOREIGN PATENT DOCUMENTS

| | | |
|---|---|---|
| 0 415 771 A2 | 3/1991 | European Pat. Off. . |
| 25 03 991 | 8/1976 | Germany . |
| 40 27 274 A1 | 3/1992 | Germany . |
| 57-132010 | 8/1982 | Japan . |
| 57-157133 | 9/1982 | Japan . |
| 58-195112 | 11/1983 | Japan . |
| 61-181908 | 8/1986 | Japan . |
| 63-290933 | 11/1988 | Japan . |
| 615373 | 1/1976 | Russian Federation . |
| 126505 | 10/1986 | Russian Federation .............. 73/65.07 |
| 789692 | 12/1986 | Russian Federation .............. 73/65.01 |
| 1781576 | 12/1992 | Russian Federation .............. 73/65.01 |
| WO 88-06720 | 9/1988 | WIPO . |
| WO 88/06720 | 9/1988 | WIPO . |

Primary Examiner—Richard Chilcot
Assistant Examiner—Max H. Noori
Attorney, Agent, or Firm—Jones & Askew

[57] ABSTRACT

A non-intrusive method and apparatus for determining the center of gravity of a package, while the package is moving. A multi-segment conveyor is used having segments at differing slopes relative to each other, along with sensors used to approximate the time it takes a box to "tilt" from one conveyor segment to the other. Also disclosed is the use of a herringbone conveyor in conjunction with a plurality of sidewardly disposed sensors to approximate one spacial coordinate of the package's gravity center with the use of the tilting process.

13 Claims, 7 Drawing Sheets

OP = a
HIJK - CG's plane on ABB'A'
OH = PP' = b

H'I'J'K' - CG's plane on CDD'C'
OH' = b'

PACKAGE REACHES CREST

CG IS STABLE

PHOTOCELLS PS1 AND PS2 TRIPPED

A KNOWN

PACKAGE CG PLANE REACHES CREST (BEGINS TILT)

PACKAGE STARTS ROTATING AROUND CONVEYOR PEAK

CG UNSTABLE

PACKAGE HAS ROTATED

MS1 AND MS2 TRIPPED

D AND C KNOWN 5,672,815

1

METHOD AND APPARATUS FOR MEASURING OUTSIDE DIMENSIONS AND THE CENTER OF GRAVITY OF A PACKAGE

This is a continuation of application Ser. No. 08/478,234, filed Jun. 7, 1995 now abandoned.

TECHNICAL FIELD

The present invention relates in general to packaging, package handling, automation and robotics, and particularly relates to a method and apparatus for measuring parameters of a parallelepiped object such as the object's length, width, height, and center of gravity.

BACKGROUND OF THE INVENTION

In the field of random-size rectangular package handling and transportation, it is often desired to provide "pallets" of such packages in a stacked condition. In order to assist in the stacking of the packages in a stable manner, it is advantageous to measure all outside dimensions and to approximate the center of gravity of a particular package. This information can be used to ensure that the package is not stacked in an unsafe position, or in exceptional cases, is not stacked at all.

In the prior art it is known approximate the center of gravity of a particular item. For example, Soviet Union reference no. 615373 shows an article 4 laid on a platform 2 resting on drums 3 over load cells 5 to measure the center of gravity. International Patent No. WO/06720 describes the location of a gravity center by tilting the container while on a stationary base.

U.S. Pat. No. 5,301,544 to Smith discloses a method and apparatus for approximating the center of gravity of a package placed upon a conveyor. However, the package must be decelerated and stopped.

U.S. Pat. No. 5,340,950 to Brandorft discloses a method and apparatus for weighing an object in which the object is moved to, and tipped over, a tip point. Although this process measures the weight of a package, it does not disclose the movement of the approximate location of the package's center of gravity.

Although the above-described prior art includes many advantages, disadvantages do exist. For example, the Smith patent requires that the package be decelerated and stopped prior to its being weighed for gravity center determination purposes. The Brandorft patent allows the package to be weighed "on the fly", but it should be understood that only the package weight is determined, not its center of gravity.

Therefore, it may be seen that there is a need in the art to provide a package conveyor system which measures outside dimensions and approximates the center of gravity of a package without decelerating or stopping the package, and without opening or otherwise damaging the packages.

SUMMARY OF THE INVENTION

The present invention overcomes deficiencies in the prior art by providing a conveyor system which measures outside dimensions and approximates the location of the gravity center of a package without stopping or decelerating the package.

Generally described, the present invention relates to the use of a tilting conveyor having at least one peak, and also including a plurality of sensors used to estimate the time a package takes to tilt over the peak.

Generally described, the present invention also relates to the use of a herringbone conveyor in combination with side sensors to determine one spatial coordinate of a package's center of gravity.

Therefore, it is an object of the present invention to provide a method and apparatus for locating the center of gravity of a package.

It is a further object of the present invention to provide a method and apparatus for locating the center of gravity of a package while on a conveyor.

It is a further object of the present invention to provide a method and apparatus for locating the center of gravity of a package while on a moving conveyor.

It is a further object of the present invention to provide a method and apparatus for locating the center of gravity of a package which does not damage the package or require its opening.

It is a further object of the present invention to provide a method and apparatus for measuring up to three outside dimensions of a package on a moving conveyor.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Reference is now made to the drawings, in which like numerals identify like elements throughout the several views.

General Operation

Figure 1A:
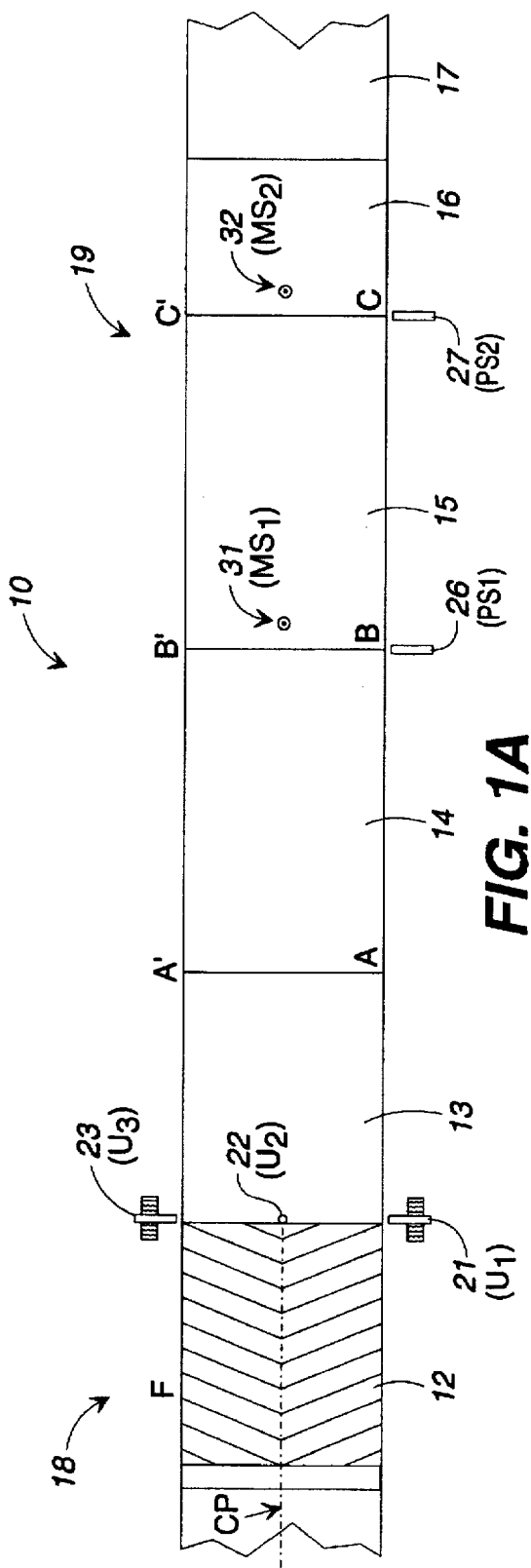
FIGS. 1A and 1B are top and side elevational views, respectively, of an apparatus 10 according to the present invention including a tilt conveyor portion 19 and a measuring station 18.
Figure 1B:
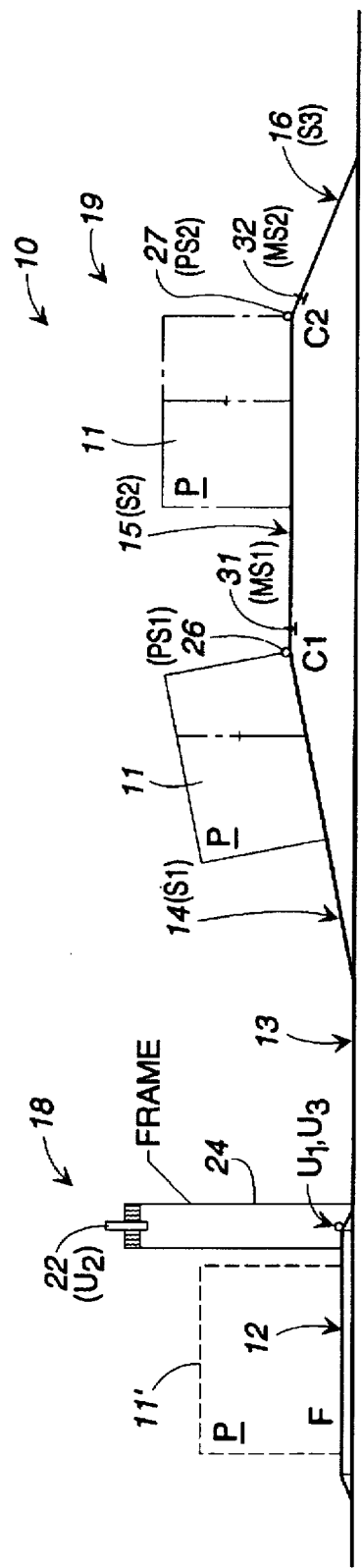
Figure 2:
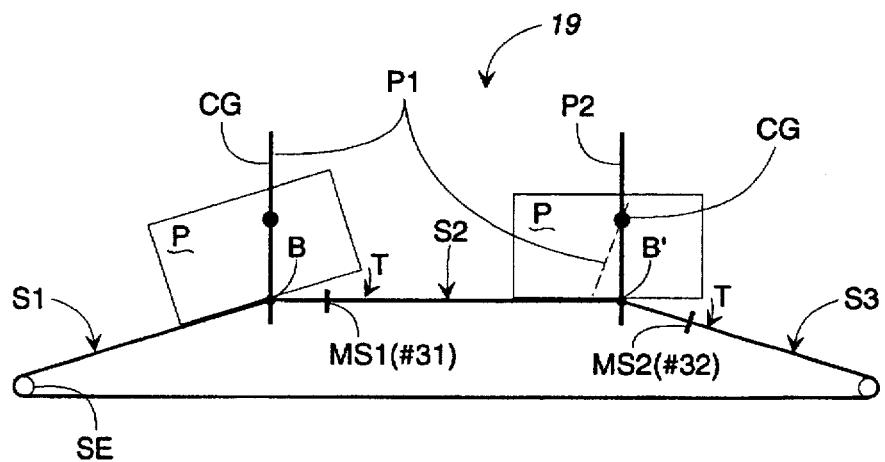
FIG. 2 is a side illustrative view of a method and apparatus according to the present invention, which illustrates a package P passing along a conveyor, which includes three supporting surfaces S1, S2, and S3, two "peaks" or crests C1 and C2 and a shaft encoder SE.
Figure 3:
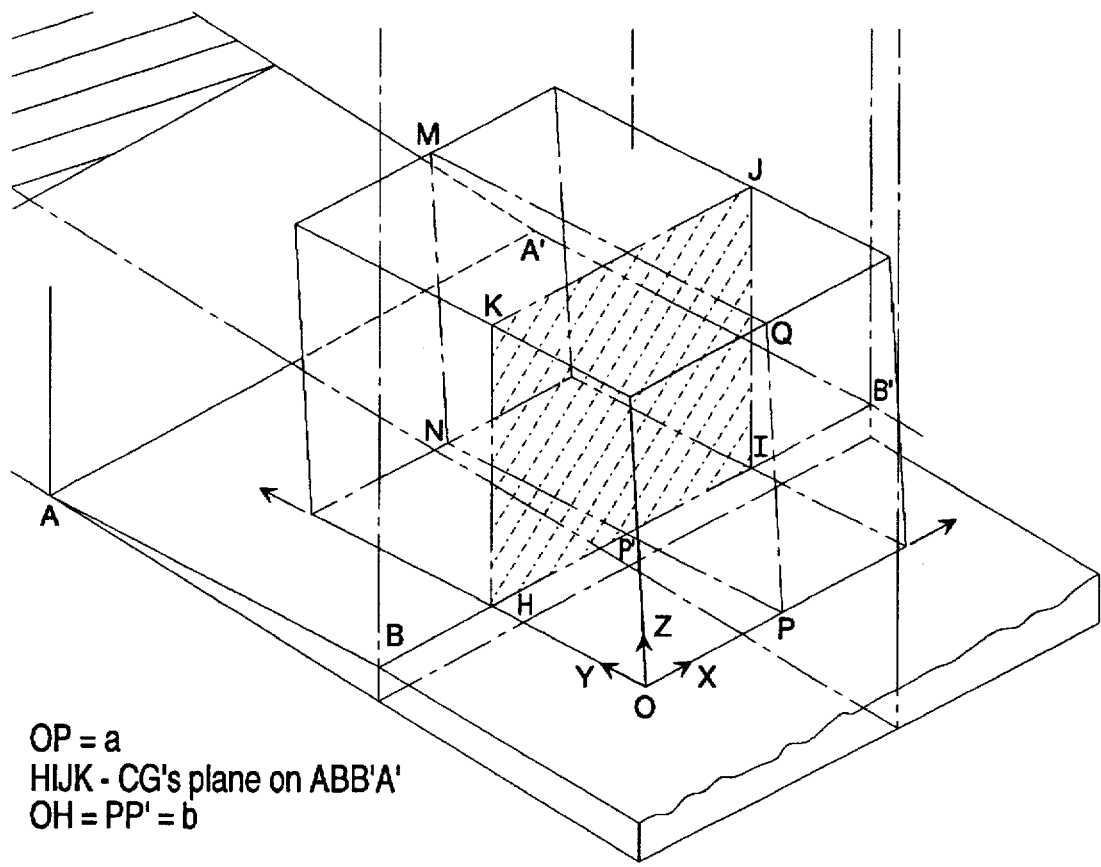
FIG. 3 is an illustrative view of package reaching a first "peak" on the tilting conveyor.
Figure 4:
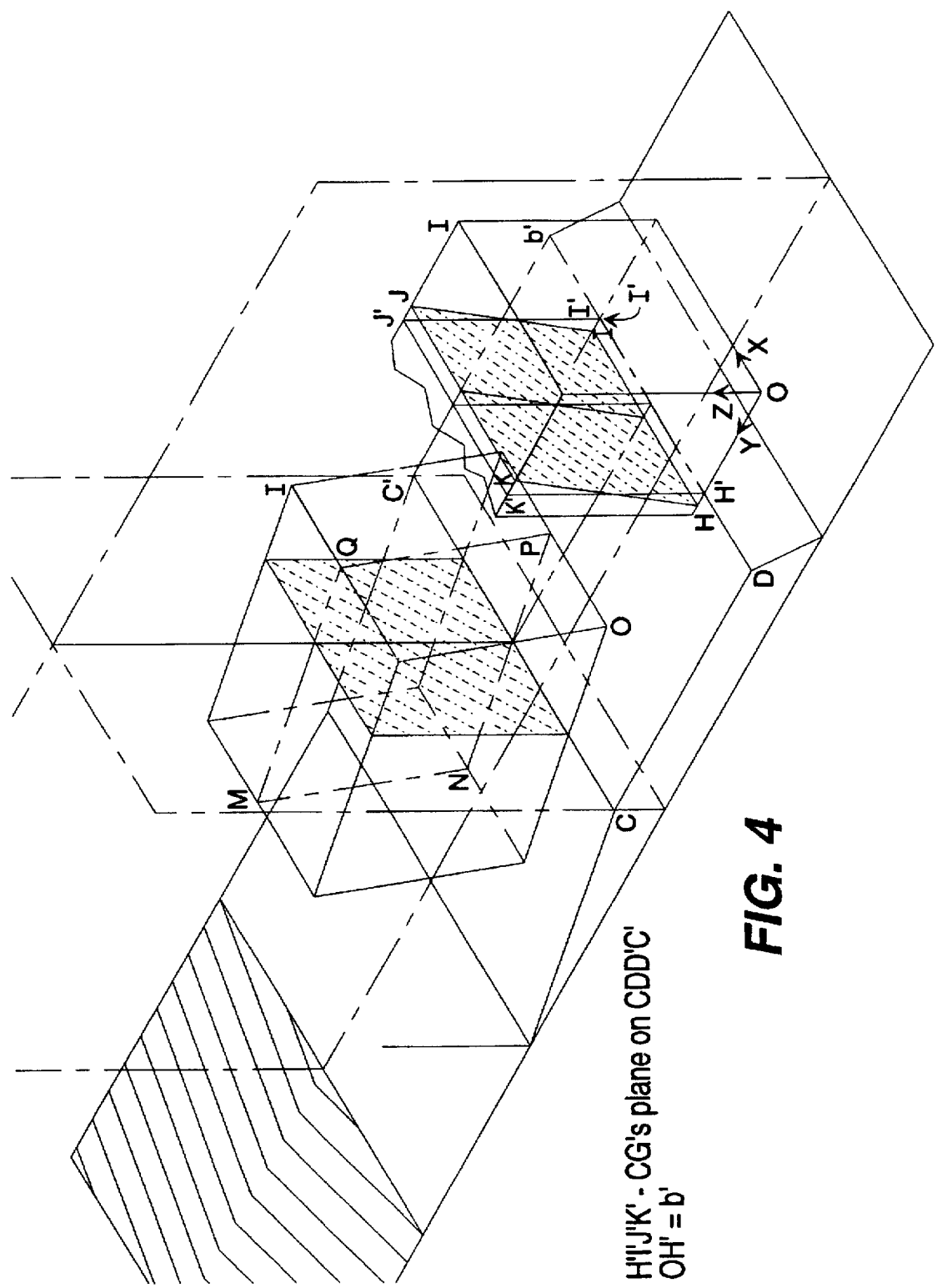
FIG. 4 is an illustrative view of a package reaching two different "crests" on the tilting conveyor.

Reference is now made to FIGS. 1A and 1B, which are top and side elevational views, respectively, of an apparatus 10 according to the present invention, as well as FIG. 2, which is an illustrative side view of a tilt conveyor portion 19 of the apparatus 10.

The apparatus 10 includes a herringbone roller conveyor 12, a substantially horizontal lead-in conveyor portion 13, a "first" conveyor portion 14 defining a first support surface S1 being inclined from horizontal, a "second" conveyor portion 15 defining a second support surface S1 being substantially horizontal, a "third" conveyor portion 16 defining a third support surface S3 being inclined from horizontal, and a final horizontal conveyor portion 17 (See FIG. 1A only). The apparatus also includes three ultrasound sensors 21, 22, and 23, (also referenced as U1, U2, and U3) mounted to a measuring arch 24, and through beam photosensors 26, 27, attached relative to the tilt conveyor 19. First and second microswitches 31, 32, (also referenced as MS1 and MS2) are also included as part of the apparatus 10.

Reference is now made particularly to FIG. 2, which generally illustrates a package P passing along a tilt conveyor such as 19, which includes three supporting surfaces S1, S2, and S3. The center of gravity of the package P is designated as CG. As may be understood, as the package P is conveyed from support surface S1 to support surface S2, the package will begin to "tilt" (clockwise as viewed) as soon as the CG passes through vertical plane P1, which is perpendicular to the plane of the drawing paper. After this tilting is complete, the package P will then rest upon the supporting surface S2. Likewise, the package will begin to "tilt" as soon as the CG passes through vertical plane P2, which is also perpendicular to the drawing paper plane. As may be seen, both of these planes pass through the CG of the package P. By determining the location of these planes with respect to the package, two dimensions of the CG of the package may be determined.

By using the measuring conveyor assembly in conjunction with the measuring arch assembly, the length, width, height, and gravity center location of a particular package may be determined, without opening the package. This can be done "on the fly", or in other words without stopping or otherwise significantly accelerating or decelerating the package.

More Detailed Discussion—Measuring Arch Assembly

Reference is again made to FIG. 1A, which illustrates the herringbone conveyor 12, which is substantially horizontal in the preferred embodiment, and includes a center plane CP. The herringbone conveyor 12 is such as known in the art, but in summary can include a plurality of powered rollers having downstream and outwardly-directed force components, such that a package surface contacting the herringbone conveyor will be urged downstream but also outwardly relative to the vertical center plane CP of the herringbone conveyor. This center plane CP of the herringbone conveyor extends longitudinally along the herringbone conveyor, and is approximate the dimensional center of the herringbone conveyor, although other locations are contemplated under the present invention.

Referring now also to FIG. 1B, a frame member or arch 24 is located at the downstream end of the herringbone conveyor 12. Ultrasound sensors 20, 21, and 22 are attached to the arch 13. As discussed in detail below, sensor 22 is used to determine the height of the package, "H", as the package passes through the arch. Sensors 21 and 23 face inwardly and at each other. As discussed below, they are used to measure their distances to the package's side faces, and in turn the package's width. Sensor 21 is a continuous transmitter, and also establishes the length of the package by use with a conveyor shaft encoder (not shown) such as known in the art.

Tilt Conveyor Assembly

Reference is now made to FIG. 1B, which illustrates the tilting conveyor assembly 19 according to the present invention. As described above, the assembly 19 includes a lead-in conveyor portion 13, a "first" conveyor portion 14 defining a first support surface S1 being inclined from horizontal, a "second" conveyor portion 15 defining a second support surface S1 being substantially horizontal, a "third" conveyor portion 16 defining a third support surface S3 being inclined from horizontal, and a final horizontal conveyor portion 17 (See FIG. 1A only).

Also included are through beam photosensors 26, 27, (also referenced as PS1 and PS2) and microswitches 31, 32 (also referenced as MS1 and MS2). As may be understood, the through beam photosensors 26, 27, are positioned to the side of the tilting conveyor assembly 19, and are positioned to provide a signal when a package reaches the first and second "crests", respectively, of the tilting conveyor assembly. As may be understood, the first crest is substantially linear and elongate, and is at the intersection of the first and second supporting surfaces S1 and S2. The second crest is similarly located at the intersection of the second and third supporting surfaces S2, S3, respectively. In the preferred embodiment, these crests are coparallel and each perpendicular to the direction of package flow.

Methods of Taking Actual Readings

The method of operation of the measuring arch 24 is now described. Referring now to FIG. 1B, a package is conveyed from an upstream position (not shown) to the location such as shown as 11' in FIG. 1B. To measure the package height, the sensor 22 is used.

Figure 6:
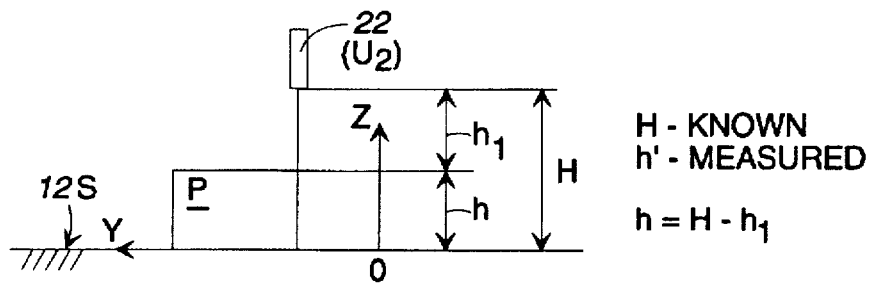
FIG. 6 is an illustrative view of the manner in which an overhead sensor 22 determines package height H.

Referring now also to FIG. 6, it will be understood by those skilled in the art that by knowing the distance h of the sensor relative to a reference point such as the supporting surface 12S of the herringbone conveyor, and by use of the sensor 22 to determine the distance h1 from the sensor U2 to the top of the conveyor, the height h of the package can be calculated by the calculation $$h = H - h_1$$

Referring again to FIG. 6, as the ultrasonic sensor 22 is a continuous transmitter, it can serve an advantageous dual function; the length of the package (along the "y" direction) may be determined by determining the distance the herringbone conveyor travels while the sensor provides a continuous reading above a certain threshold which can be used to determine package presence. The distance traveled by the conveyor while this presence is known may be done by knowing belt velocity by shaft encoding (such as provided at SE in FIG. 2)or other means known in the art.

Figure 7:
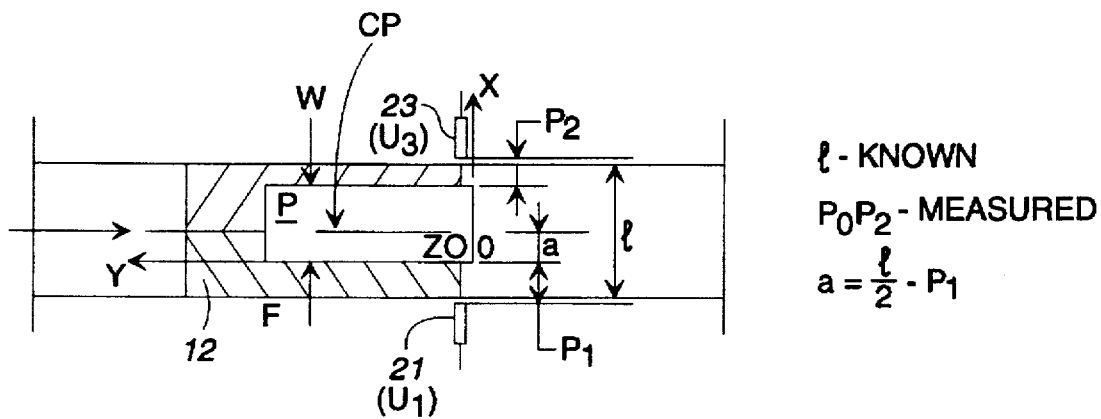
FIG. 7 is an illustrative view of the manner in which side sensors 21, 23 are used to determine package width W, and a herringbone conveyor is used to align the center of gravity of the package on the herringbone conveyor's center plane CP.

Referring now to FIG. 7, the method for determining the package width is discussed. As previously discussed with respect to FIG. 1B, a package is placed upon the herringbone conveyor 12. As known in the art, the herringbone conveyor will orient the package lengthwise, and the package's center of gravity will be centered into a plane CP perpendicular to the herringbone conveyor's surface and passing through or parallel to the conveyor's longitudinal center line.

As shown in FIG. 7, side sensors 21, 23, are positioned on each side of the package path of the herringbone conveyor 12. As may be understood by those skilled in the art, by comparing the "read" values of these two sensors with the known distance between the sensors, the width "w" of the package may be determined by executing the calculation:

$$w = l - (p_1 + p_2)$$

Again, referencing FIG. 7, the distance "a" (which as seen later is one spacial coordinate of the package's center of gravity) may also be located by executing the calculation $$a = \frac{l}{2} - p_1$$

The method of operation and the taking of readings by the tilt conveyor assembly is now discussed. Reference is now made to FIGS. 1A and 1B. After all of its geometrical dimensions are determined, the package starts climbing the slope of the first inclined belt portion 14. Photosensor 26, located proximate the first crest C1 of the conveyor assembly 19, detects when the package begins exiting the first supporting surface 14. A microswitch 31 is located just downstream of the first crest C1. The microswitch 31 detects the moment when the package touches the surface 14. This is done by using a "split" conveyor configuration which includes the use of dual, side-by-side conveyor belts providing a central longitudinal "split" or gap through which the microswitch trigger may extend.

A second photosensor 27 is located proximate the second crest C2 of the conveyor, such that in one embodiment the photosensor is triggered when the leading edge of the package begins exiting the second supporting surface 15. A second microswitch 32 is located just downstream of the second crest C, and detects the moment when the package touches the surface 15. Again a split conveyor allows for this use.

Coordinates and Geometric Principles

As discussed above, and again in reference to FIG. 2, two planes P1, P2, are defined which include the center of gravity of the package. By determining the location of these two planes relative to a package, two of the three coordinates of the CG of the package may be determined.

In order to locate the positions of the two planes, as shown in FIG. 2, points B and B' are defined as being points on the two respective planes. Point B is a point both on plane P1 and on the bottom surface of the package (which is supported by the first supporting surface S1 of the conveyor). Point B' is a point both on plane P2 and on the bottom surface of the package (which is supported by the second supporting surface of the conveyor). By approximating these two points B and B', and by knowing the dimensions of the conveyor, the planes P1 and P2 can be located. As previously discussed, by knowing the location of planes P1, and P2, and P3, all three coordinates of the center of gravity CG of the package may be located.

Figure 5A:
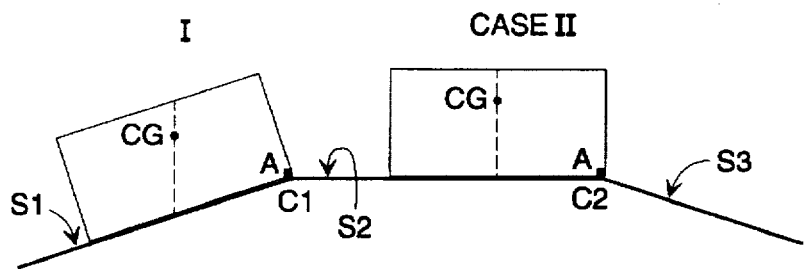
FIGS. 5A–5D are sequential illustrative views of a package in sequential Case "I" and Case "II" modes.

In order to approximate points B and B', reference is made to FIGS. 5A–5D, which illustrate the movement of an exemplary package in a "case I" and "case II" mode of operation. As seen in FIG. 5A, the case I package is just reaching the first crest C1 of the tilt conveyor. At this point, the first photosensor (not shown in FIGS. 5A–5D) is triggered. In FIG. 5A, the case II package is just reaching the second crest C2 of the tilting conveyor. At this point, the second photosensor (not shown in FIGS. 5A–5D) is triggered.

Figure 5B:
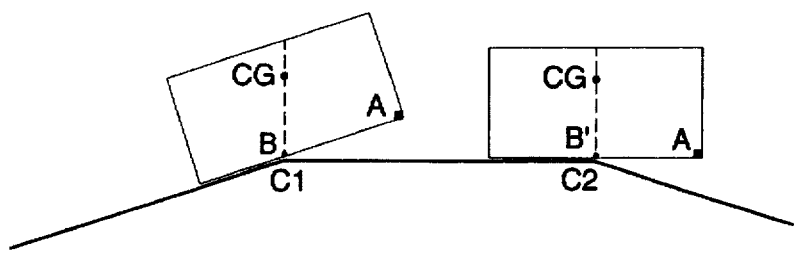

In FIG. 5B, the center of gravity CG of the case I package is shown instantaneously crossing the vertical plane of the first crest. At this instant the package has just become unstable, and begins to rotate clockwise as the figure is viewed. Similarly, the center of gravity CG of the case II package is instantaneously crossing the vertical plane of the second crest. It is important at this point to understand the importance of approximating the respective instants at which this happens, as knowledge of these instants of time, combined with the knowledge of the dimensions of the package (determined by the dimensioning arch) and the location of the package on the conveyor (known from use of the photosensors 26, 27 and shaft encoding) allows for the approximation of two of the three dimensional coordinates of the package CG. As discussed above, the third coordinate is found by the use of the herringbone conveyor and the side sensors 21, 23.

Figure 5C:
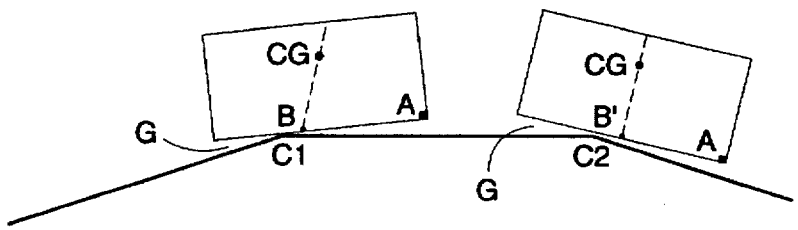
Figure 5D:
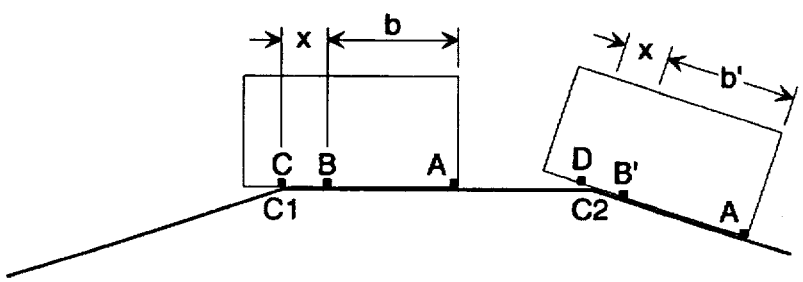

Reference is now made to FIG. 5C, which illustrates the packages in unstable positions, as they continue to rotate clockwise, until they reach the positions shown in FIG. 5D. The time at which this occurs is measured by microswitches 31, 32, discussed above.

As may be seen, the respective distances AC and AD are measurable. Distance AC may be found by multiplying the known conveyor belt speed by the measured difference between the signal times of the photosensor 26 (also called P2) and the microswitch 31 (also called MS1). Distance AD may be found by multiplying the known conveyor belt speed by the measured difference between the signal times of the photosensor 27 (also called P3) and the microswitch 32 (also called MS2). In other words, $$AC = (\text{belt velocity})(t_{MS1} - t_{P2})$$

$$AD = (\text{belt velocity})(t_{MS2} - t_{P3})$$

Assuming that no motion is lost between the package and the supporting conveyor, it may be seen that distance AB is the distance the conveyor moves from the time the package first passes the first crest (see FIG. 5A) to the time the package begins to rotate (see FIG. 5B). Distance BC is the additional distance the conveyor travels while the package is rotating and up to the time the package trips the microswitch MS1 and stops rotating. The sum of the distances AB and BC equals distance AC. Under the same logic, it may be seen that the sum of the distances AB' and B'D equals distance AD.

Therefore, since $$AB + BC = AC$$

and $$AB'+B'D=AD$$

then $$AB=b=AC-BC$$

and $$AB'=b'=AD-B'D$$

where b and $b^1$ are the distances from the package's lead edge to the respective planes P1, P2 when measured along the package's lower surface.

Since as discussed above $$AC=(\text{belt velocity})(t_{MS1}-t_{P2})$$

$$AD=(\text{belt velocity})(t_{MS2}-t_{P3})$$

and $$BC=(\text{belt velocity})(t_{rotI})$$

and $$B'D=(\text{belt velocity})(t_{rotII})$$

where $t_{rotI}$ and $t_{rotII}$ are rotation times for the I and II case packages, then $$b=(\text{belt velocity})[(tms1-tp2)-t \text{ rot } I]$$

$$b'=(\text{belt velocity})[(tms2-tp3)-t \text{ rot } II]$$

Therefore it may be seen that the distances b and b' can be approximated by approximating the time of rotation of the packages, assuming that the belt velocity and sensor times have already been calculated as described above. Two different ways of approximating the rotation time are discussed in detail below.

With the values of a, b, and b' known, then the x, y, and z coordinates of the center of gravity CG (see FIG. 8) can be defined by analyzing the intersection of the three planes defined by these values.

From OP=a, the equation of plane MNPQ is:

$$x=a$$

To find y, it may be understood that $$OH=PP'=b$$

and α is 100° (assuming the angle of the inclined conveyor is 10°).

Figure 8:
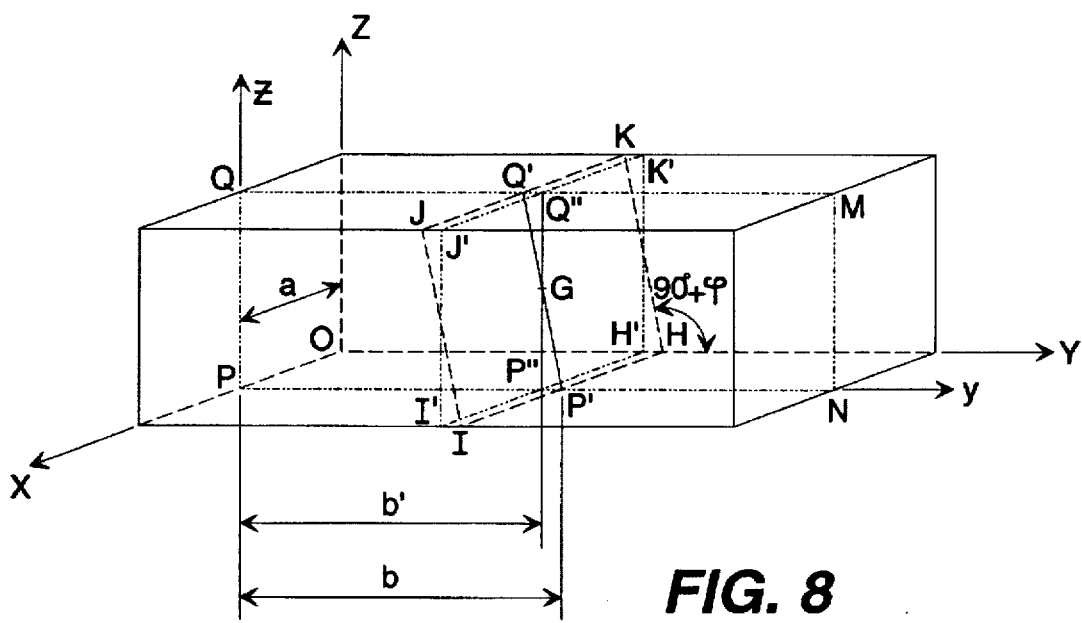
FIG. 8 is an illustrative view of dimensions used in association with a package. It should be noted that FIG. 8 is FIG. 4, position II, but it is rotated 180 degrees around the 0Z axis.

As shown in FIG. 8, it may also be seen that Line P' Q' is the intersection of the plane MNPQ with plane HIJK, and the CG is located at the intersection of these two planes. As angle Q' P' N equals α, which equals 100 degrees, the equation of line P' Q' in plane zPy is:

$$y-b=mz$$

where $$\begin{aligned} m &= \tan \alpha \\ &= -5.67 \text{ (where } \alpha = 100 \text{ degrees)} \end{aligned}$$

such that $$y-b=-5.67 (z).$$

In coordinates XYZ (see FIG. 8) P' Q' is the intersection of:

$$x-a=0 \text{ (plane MNPQ)}$$

and $$y=5.67(z)=0 \text{ (plane HIJK)}$$

The equation $$OH'=PP''=b'$$

defines plane H'T'J'K' and line P" Q", which is the intersection with plane MNPQ and also includes the CG.

In the system of coordinates zPy, the equation of line P" Q" is $$y=b'$$

As a result, the z position of the CG results as an intersection of the two lines P' Q' and P" Q", as may be expressed by:

$$y-b=-5.67 \text{ z,}$$

or $$y=b'$$

By resolving the two above equations, it may be seen that $$z=\frac{b-b'}{5.67}.$$

In the more general case where α is not necessarily 100°, $$z=\frac{b'-b}{m}.$$

In summary, the center of gravity's position in the XYZ coordinates is:

$$x=a$$

$$y=b$$

and $$z=\frac{b'-b}{m}$$

where m is a constant.

There it may be seen that as the length, width, and height of the package have been measured in the previous steps (such as by the measuring arch 18, shown in FIG. 1B), by using previously described sensors U1, U2, and U3 (see FIG. 1), then all possible package parameters (length, width, height, weight, and CG location) are known.

In order to approximate the package rotation times $t_{rotI}$ and $t_{rotII}$, under one embodiment of the invention dynamic motion analysis may be conducted. It will be seen that this dynamic motion analysis includes a general analysis of a package passing over a crest, particular "Case I" and "Case II" analyses which fall under the general analysis, and a simplified analysis, which provides a usable estimation algorithm which is derived by making a few assumptions regarding the package CG location. By using the estimation algorithm from the simplified analysis, an estimation of distances AB and AB' in FIGS. 5A–5C may be made, which allows for an estimation of two spatial coordinates of the CG.

General Case

Figure 9:
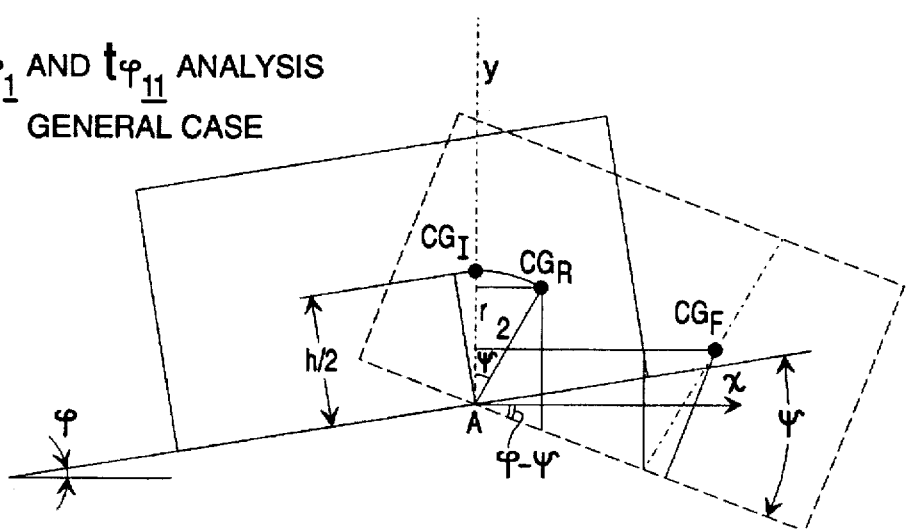
FIG. 9 is an illustrative view of a package tilting from a first supporting surface at an angle $\phi$ from horizontal to a second supporting surface at an angle $\psi$ relative to the first supporting surface.

To discuss the general analysis, reference is now made to FIG. 9, which is a general representation of motion analysis of a package having a CG passing from a first conveyor surface at an angle PHI ($\phi$) from horizontal to a second conveyor surface at an angle PHI-PSI ($\phi+\psi$) from horizontal.

The example crest in this FIG. 9 is designated as A. It should be understood that with respect to the discussion relating to FIG. 9, the center of gravity is assumed to be half of the box height, or "h/2".

The center of gravity at its initial point of instability (directly above the crest) is denoted as $CG_I$, is denoted as $CG_R$ when rotation only around the crest A is considered, and is denoted as having a final position $CG_F$ when rotation and translation from initial position $CG_I$ is considered.

Position $CG_I$ has coordinates $x_I$, $y_I$, which can be seen to be valued at o, r, respectively, under the selected coordinate system. Position $CG_R$ has coordinates ($x_R$, $y_R$), and position $CG_F$ has coordinates ($x_F$, $y_F$).

It may be seen that $$x_R = r \sin \psi$$

$$y_R = r \cos \psi$$

For the rotation segment of the path between positions $CG_R$ and $CG_F$ (referenced now as a path "R/F"), it may be seen that $$x_{R/F} = vt \cos(\phi - \psi)$$

and $$y_{R/F} = vt \sin(\phi - \psi).$$

Therefore, again in reference to FIG. 9, it may be seen that $$x_F = x_I + x_{R/F} = r \sin \psi + vt \cos(\phi - \psi)$$

and $$y_F = y_I + y_{R/F} = r \cos \psi + vt \sin(\phi - \psi).$$

Figure 12:
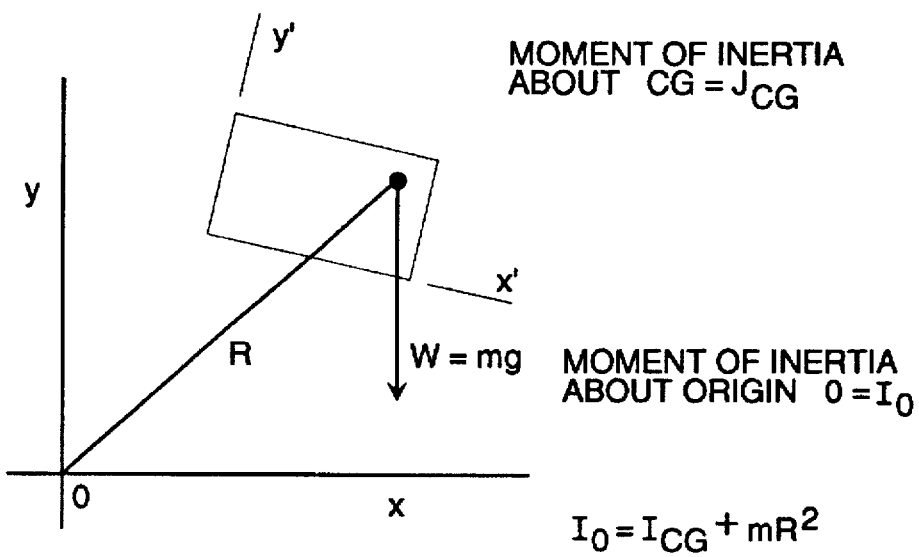
FIG. 12 is an illustrative view illustrating mathematical principles. As may be seen, $I_o$ is the moment of inertia of a body around its own center of gravity (having coordinates x', y') and I is the moment of inertia of a body around a point different from its center of gravity CG having coordinates (x,y).

Reference is now made to FIG. 12. Under a torque analysis, it is known that $$Wx = I\Theta$$

where W is the package weight, x is the horizontal distance from the W force vector to a reference point O, $I_o$ is the moment of inertia of the package about the reference point, and $\Theta$ is its angular acceleration about the reference point.

Continuing in reference to FIG. 12, from tables it is known that $$I_o = I_{CG} + mR^2$$

$$R^2 = x^2 + y^2$$

where $I_o$ is the moment of inertia of a package about its CG, R is the distance of the CG from the origin O, and m is package mass. Therefore, substituting from the equations discussed with FIG. 9, it may be seen that the angular acceleration of the package in FIG. 9 as it rotates about peak "A" may be set forth as $$\ddot{\Theta} = \frac{Wx}{I} = \frac{W[r\sin\psi + vt\cos(\phi - \psi)]}{I_0 + m\{[r\sin\psi + vt\cos(\phi - \psi)]^2 + [r\cos\phi + vt\sin(\phi - \psi)]^2\}}$$

There are two particular cases which will now be addressed. Case I is where $\psi = \phi$, (package tilting from inclined to horizontal) and Case II is where $\phi = 0$ (package tilting from horizontal to inclined).

Particular Case I

Figure 10:
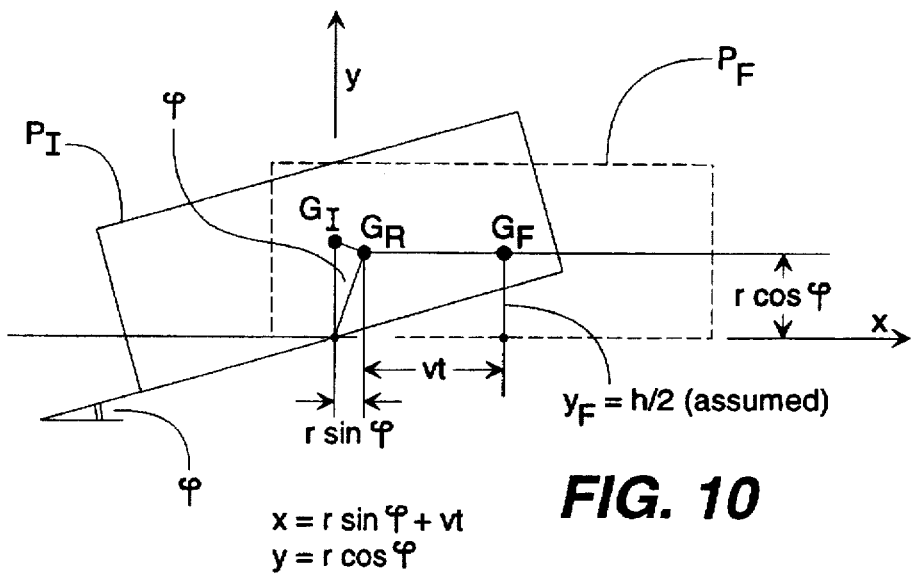
FIG. 10 is an illustrative view illustrating a package passing from a first supporting surface (package shown in solid line) to a second supporting surface (package shown in dotted line), in the particular case where the second surface is horizontal.

Reference is now made to FIG. 10, which illustrates the Case I situation, where the package is shown tilting from an initial position $P_I$ (inclined $\phi$ to horizontal, shown in solid line) to a horizontal, final position $P_F$ (shown in dotted line).

As in the general case discussed previously, movement of the center of gravity of the package shown in FIG. 10 may be thought of as a combination of two different movements, a movement of the center of gravity initial position $CG_I$ through rotation to position $CG_R$, and then through pure translation to final position $CG_F$. As may be seen by that shown in FIG. 10, as the second supporting surface in this "case I" is horizontal, the formula for coordinates (x, y) of the moving center of gravity at any place along the actual path between positions $CG_I(t=o)$ and $CG_F$ can be described as $$x = r \sin \phi + vt$$

and $$y = r \cos \phi.$$

From tables, it is known that $$I = I_o + mR^2$$

and $$I_0 = \frac{m}{12}(h^2 + l^2).$$

It is also known that $$R^2 x^2 + y^2.$$

Substituting these values into the torque equation, it may be seen that $$\ddot{\phi} = \frac{Wx}{I} = \frac{w(r\sin\phi + vt)}{I_0 + m\,[(r\sin\phi + vt)^2 + (r\cos\phi)^2]}$$

Making an assumption that $$y = h/2,$$

we know that $$\cos\phi = \frac{h/2}{r}$$

and $$r = \frac{h}{2\cos\phi}$$

and so $$\ddot{\phi} = \frac{w\left(\frac{h}{2}\tan\phi + vt\right)}{I_0 + m\left[\left(\frac{h}{2}\tan\phi + vt\right)^2 + \frac{h^2}{4}\right]}$$

and

-continued $$\ddot{\phi} = \frac{mg\left(\frac{h}{2}\tan\phi + vt\right)}{m\left[\frac{1}{12}(l^2+h^2)+\left(\frac{h}{2}\tan\phi + vt\right)^2 + \frac{h^2}{4}\right]}.$$

If we let $$D = \frac{h}{2}\tan\phi$$

and $$C = \frac{1}{12}(l^2+h^2)+\frac{h^2}{4} = \frac{1}{3}\left(\frac{l^2}{4}+h^2\right)$$

then $$\ddot{\phi} = \frac{g(D+vt)}{C+(D+vt)^2}$$

This can be derived once to $$\dot{\phi} = \int \frac{g(D+vt)}{C+(D+vt)^2} dt = \int \frac{gu}{C+u^2} \frac{du}{v}$$

If we let $$D+vt=u$$

then $$t = \frac{u-D}{v}$$

and $$vdt=du$$

and $$dt = \frac{du}{v}.$$

Substituting back, it may be seen that $$\dot{\phi} = \int \frac{gu}{C+u^2} \frac{du}{v}.$$

Since g (gravity) is assumed to be constant, $$\dot{\phi} = g\int \frac{u}{C+u^2} \frac{du}{v}$$

and $$\dot{\phi} = g \frac{1}{2v} \ln(\sqrt{C}+u^2)+C_1$$

Therefore, $$\dot{\phi} = \frac{g}{2v} \ln[\sqrt{C}+(D+vt)^2]+C_1.$$

For t=0, we know that $\dot{\Theta}=0$, therefore, $$0 = \frac{g}{2v} \ln[\sqrt{C}+D^2]+C_1$$

Then $$C_1 = -\frac{g}{2v} \ln(\sqrt{C}+D^2).$$

Integrating, $$\phi = \int \left(\frac{g}{2v} \ln(\sqrt{C}+u^2)+C_1\right) du$$

$$= \int \frac{g}{2v} \ln(\sqrt{C}+u^2)du + \int C_1 du$$

From tables, it is known that $$\int [\ln(x^2+a^2)]dx = x\ln(x^2+a^2)-2x+2a\arctan\frac{x}{a}$$

Therefore, $$\phi = \frac{g}{2v} \Big\{ (D+vt)\ln[(D+vt)^2+C]-2(D+vt)+ $$
$$ 2\sqrt{C}\arctan\frac{D+vt}{\sqrt{C}} \Big\} +C_1(D+vt)+C_2$$

For t=0, we know that angular velocity $\dot{\Theta}=0$, so $$C_2 = -\frac{g}{2v}\left[D\ln(D^2+C)-2D+2\sqrt{C}\arctan\frac{D}{\sqrt{C}}\right]-C_1D$$

Case II

Case II (See FIG. 5) is the situation where the package is tilting from a horizontal to a downwardly inclined surface, such as when the package tilts about point C in FIG. 1. As may be seen, calculations such as shown in reference to Case I are applicable.

For control engineering simplification purposes, the microswitch MS2 (#32 in FIG. 1B) can protrude upwardly relative to the second inclined conveyor supporting surface, such that the microswitch's contact will be closed at the point the package has tilted to a desired angle, which could be the same angle as in the Case I.

Simplified Analysis

Figure 11:
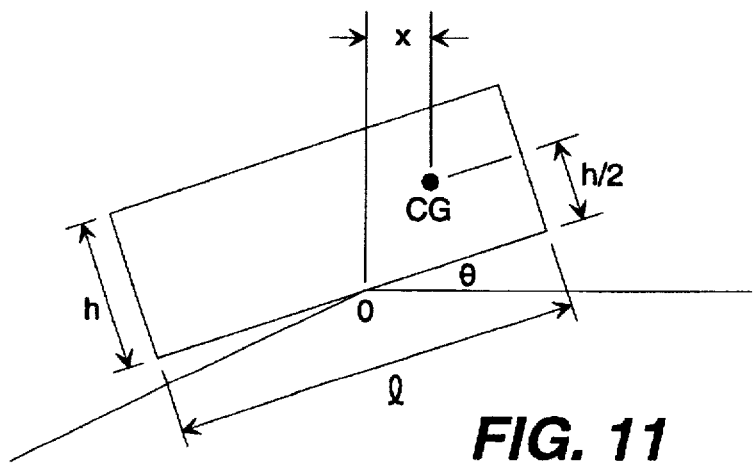
FIG. 11 is an illustrative view illustrating a package in the midst of tilting from contact with a first supporting surface to contact with a second supporting surface.

Reference is now made to FIG. 11, in order to discuss a simpler version of analysis compared to that taken with respect to Cases I and II. Under this analysis, Wx=IΘ, Where x is the horizontal component of the CG's distance from the horizontal plane including crest "O", I is inertia about O, w is weight, and $\Theta$ is angular acceleration (this corresponds to the $\phi$ discussed before).

For a small $\Theta$, it can be assumed that x=vt, where v is belt velocity, and t is the time from when the package begins its tilt to when the package completes its tilt. Assuming all the mass is at the CG, from tables we know $I=I_o+mR^2$.

So, again assuming that $$y = h/2$$

then $$R = \sqrt{x^2 + \left(\frac{h}{2}\right)^2} = \sqrt{v^2 t^2 + \left(\frac{h}{2}\right)^2}.$$

Solving for $\Theta$, $$\ddot{\Theta} = \frac{Wvt}{I_0 + m\left[v^2 t^2 + \left(\frac{h}{2}\right)^2\right]}$$

so $$\ddot{\Theta} = \frac{Wvt}{mv^2 t^2 + \left[I_0 + m\left(\frac{h}{2}\right)^2\right]}$$

If we allow $$A = \frac{Wv}{I_0 + m\left(\frac{h}{2}\right)^2}$$

and $$B = \frac{mv^2}{I_0 + m\left(\frac{h}{2}\right)^2}$$

then $$\ddot{\Theta} = \frac{At}{Bt^2 + 1}.$$

If we then allow $$A/B = C$$

and $$1/B = D$$

then $$\ddot{\Theta} = \frac{Ct}{t^2 + D} dt$$

Deriving once, $$\dot{\Theta} = \int \frac{ct}{t^2 + D}.$$

If we then let $$\int u\, dv = uv - \int v\, du$$

and let $$Ct = u$$

then $$du = C\, dt$$

and $$dv = \frac{dt}{t^2 + (\sqrt{D})^2}$$

and $$v = \int \frac{dt}{t^2 + (\sqrt{D})^2}.$$

From tables, this is equal to $$\left[\frac{1}{\sqrt{D}}\right] \tan^{-1}\left[\frac{t}{\sqrt{D}}\right] + C.$$

We know that $$C' = 0 \text{ for } t = 0.$$

Therefore, $$\begin{aligned}
\dot{\Theta} &= Ct \frac{1}{\sqrt{D}} \tan^{-1} \frac{t}{\sqrt{D}} - \int \frac{1}{\sqrt{D}} \tan^{-1} \frac{t}{\sqrt{D}} C\, dt \\
&= \frac{C}{\sqrt{D}} \left( t \cdot \tan^{-1} \frac{t}{\sqrt{D}} - \int \tan^{-1} \frac{t}{\sqrt{D}}\, dt \right) \\
&= t\tan^{-1} \frac{t}{\sqrt{D}} - \frac{\sqrt{D}}{2} \ln\left(1 + \frac{t^2}{D}\right) + C_1
\end{aligned}$$

For $t=0$, $\dot{\Theta}=0$, so $C_1=0$, and
Therefore, $$\dot{\Theta} = \frac{C}{\sqrt{D}} \left[ t \cdot \tan^{-1} \frac{t}{\sqrt{D}} - t \cdot \tan^{-1} \frac{t}{\sqrt{D}} + \frac{\sqrt{D}}{2} \ln\left(1 + \frac{t^2}{D}\right) \right] = \frac{C}{2} \ln\left(1 + \frac{t^2}{D}\right)$$

Integrating once, $$\Theta = \frac{C}{2} \int \ln\left(1 + \frac{t^2}{D}\right) dt.$$

If we then let $$1/D = a$$

then $$\Theta = \frac{C}{2} \int \ln(1 + at^2)\, dt.$$

If we then let $$1 + at^2 = x$$

then $$dx = 2at\, dt$$

and $$dt = \frac{dx}{2at}.$$

Then, $$\Theta = \frac{C}{2} \int \ln x \frac{dx}{2at}$$

$$= \frac{C \cdot D}{4} \int \ln x \frac{dx}{\sqrt{\frac{x-1}{a}}}$$

$$= \frac{C \cdot D}{4} \int \ln x \frac{dx \cdot \sqrt{a}}{\sqrt{\frac{x-1}{a}} \sqrt{a}}$$

$$= \frac{C\sqrt{D}}{4} \int \ln x \frac{d(x-1)}{\sqrt{x-1}}$$

$$= \frac{C\sqrt{D}}{2} \int \ln x \frac{1}{2} d(x-1)^{-1/2}$$

If we then let $$\ln x = u$$

and $$\frac{1}{2} d(x-1)^{-1/2} = dv$$

then $$\frac{1}{x} dx = du$$

and $$v = (x-1)^{1/2}.$$

So, $$\Theta = \frac{C\sqrt{D}}{2} \left[ (x-1)^{1/2} \ln x - \int (x-1)^{1/2} \frac{1}{x} dx \right].$$

If we then let $$x = y^2$$

and $$dx = 2y \, dy$$

then $$\int (x-1)^{1/2} \frac{1}{x} dx = \int (y^2-1)^{1/2} \frac{2y}{y^2} dy = 2 \int \frac{(y^2-1)^{1/2}}{y} dy.$$

From tables, this equals:

$$(y^2-1)^{1/2} - \frac{1}{\sec|y|} + C_2$$

Then, $$\Theta = \frac{C\sqrt{D}}{2} \{(x-1)^{1/2} \ln x - [(x-1)^{1/2} - \cos\sqrt{x} + C_2]\}$$

Since $$x = 1 + at^2,$$

then $$\Theta = \frac{C\sqrt{D}}{2} \{(at^2)^{1/2} \ln(1+at^2) - [(at^2)^{1/2} - \cos\sqrt{1+at^2} + C_2]\} =$$

$$\frac{C\sqrt{D}}{2} \{\sqrt{a} \, t[\ln(1+at^2) - 1] + \cos\sqrt{1+at^2} + C_2\}$$

Since we know that at t=0, $\Theta=0$, and $C_2=0$, and since $$a = 1/D$$

then $$\Theta = \frac{C\sqrt{D}}{2} \left\{ \frac{t}{\sqrt{D}} \left[ \ln\left(1 + \frac{t^2}{D}\right) - 1 \right] + \cos\sqrt{1 + \frac{t^2}{D}} \right\}$$

Therefore, in conclusion, the following three calculations (which may be considered one "master" calculation and two ancillary calculations) may be used under the present invention to calculate the CG location of a box having a height h, length l, and traveling on a conveyor at a velocity v under the influence of gravity, with the box orientation at time t being set forth as an angle $\Theta$).

$$\Theta = \frac{C}{2} t \left[ \ln\left(1 + \frac{t^2}{D}\right) - 1 \right] + \frac{C\sqrt{D}}{2} \cos\sqrt{1 + \frac{t^2}{D}}$$

Where $$D = \frac{4h^2 + l^2}{12v^2}$$

and $$C = g/v$$

The above equations can be used by a computer to process information available by the above-referenced measurement techniques. It may be understood that under one embodiment of the present invention, $\Theta$ can be set at a constant known value, and value h, l, v, and g are known by the measurement technique described above. Therefore, the value t can be approximated, which is the estimated time it takes the package to contact the second supporting surface once its center of gravity passes the plane of the associated crest. This value may be equated to the $t_{roll}$ and $t_{roll'}$ values previously discussed. Once t is known, the distances AB and AB' of FIGS. 5A–5D can be determined by substituting t for both $t_{roll}$ and $t_{roll'}$, which in effect provide the missing information needed to locate two spacial coordinates of the CG.

EXAMPLE

As example of a package actually being measured by the method and apparatus according to the present invention is now provided.

For purposes of example only, the distance between ultrasonic side sensors 21 and 23 will be assumed to be 36 inches, and it will also be assumed that the center plane CP of the herringbone conveyor is centered between the sensors 21 and 23. The height of the top ultrasound sensor 22 above the belt will be assumed to be 30 inches.

To determine the height h of the package, a reading from the top ultrasound sensor 22 is taken. By way of example, if the reading from the sensor 22 is 10 inches, as explained earlier in reference to FIG. 6 the height of the package will be calculated as Height=$(H-h_1)$=(30)−(10)=20 inches To determine the box width, readings from the ultrasonic side sensors 21, 23, are taken. As discussed in reference to FIG. 7, if the readings from the side sensors 21 and 23 are 2 and 3 inches, respectively, the width w of the box is calculated by the previously-discussed formula:

$w=l-(p_1+p_2)$ $w=36-(2+3)=31$

To determine the length of the package, two signals from the sensor 21 are evaluated, assuming that belt velocity is constant. These two signals are time-based, that is the first signal indicates the time the package is first sensed by the sensor 21, and the second signal indicates the time the sensor last sensed the package. The differences between these times are multiplied by belt speed to provide package length C. If the time difference is 2.33 seconds, and belt speed is again 12 inches per second, the resulting length will be Length = (time difference) (belt speed)
       = (2.33 sec) (12 in/sec.)
       = 28 inches To determine one spacial coordinate "a" (see FIG. 7) of the package's CG, the following calculation can likewise be made from known information under the calculation:

$$a = \frac{1}{2} - p_1 = \frac{36}{2} - 2 = 5 \text{ inches}$$

Therefore it may be seen that one spacial coordinate of the package's CG (5 inches) and all three outside dimensions of the package are determinable even before the package reaches the tilt conveyor. However, to determine the two remaining spatial coordinates of the CG, the tilting conveyor must be used.

As previously discussed, the length l of the example package is 28 inches. The height h is 20 inches. The velocity of the belt is 12 inches/sec.

Therefore, the two previously-discussed parameters C, D, can be calculated under the previously-discussed ancillary calculations as:

$$C = \frac{g}{v} = \frac{386.4}{12} = 32.2$$

$$D = \frac{4h^2 + l^2}{12v^2} = \frac{4(20)^2 + (28)^2}{12(12)^2} = 1.38$$

Under the "master" calculation, t may be then calculated as 2.29 seconds, which means that the calculation estimates that the package takes 2.29 seconds to rotate from the positions shown in FIG. 5B to the positions shown in FIG. 5D. Assuming the belt is traveling at 12 inches/sec., this translates to an "x" value of 27.4 inches. If it is assumed that the value AC (see FIG. 5A). is 27.8 inches, then this would mean that one spatial coordinate of the center of gravity is 0.4 inches from the front edge of the package. If it is assumed that the value AD (see FIG. 5A) is 27.9 inches, then under the calculation $$z = \frac{b'-b}{m} = \frac{27.8-27.9}{-5.67},$$

the third spatial coordinate is located, which under this calculation is the value of 0.017 inches.

Figure 13:
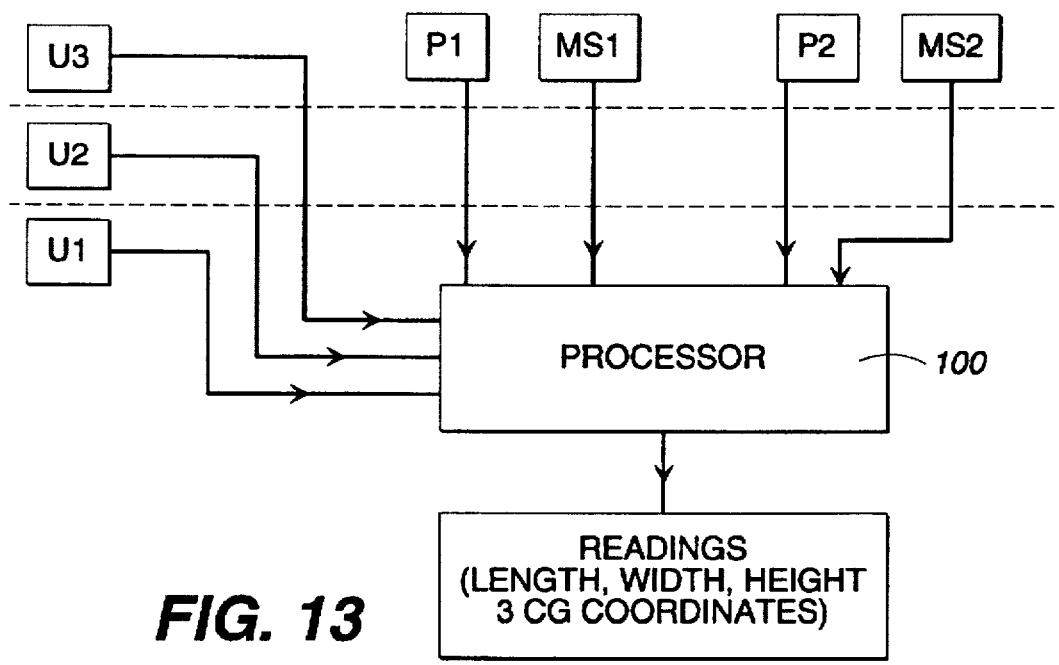
FIG. 13 is a diagram illustrating signal flow paths intermediate several elements according to the present invention.

Referring now to FIG. 13, a processor computer 100 such as known in the art is used to accept the above-referenced signals from the sensors, and provides output signals readable by an operator or a computer which corresponds to the package's three outside dimensions and three spacial coordinates of its CG.

Alternatives

It should be understood that the measuring arch and tilting conveyors may both be portable for auditing purposes, because they do not require their own power source but can obtain "borrowed" power from, for example, an existing powered belt conveyor upstream or downstream.

It should be understood that the "centerline" of said herringbone conveyor is defined as the centrally-located line from which the conveyor diverges; however, the term "centerline" does not necessarily imply that the centerline is spacially located at the longitudinal middle of the herringbone conveyor. It should also be understood that the "measuring site" at which the measuring arch takes its width measurements could be at the end of the herringbone conveyor, as shown, but the width measurements could be made even further downstream (assuming the package has been suitably sidewardly aligned by the herringbone conveyor at the time of measurement).

It should also be understood that the present invention also contemplates the use of sensor to approximate the time at which a package begins to tilt due to instability atop a particular crest. This alternate embodiment contemplates the location of a sensor which recognizes when a gap (such as "G" in FIG. 5C) is present between the package lower surface and the supporting surface the package is titling away from. Such a gap may be sensed by use of a continuous emitter such as a photocell having a path just upstream of the relevant crest and just above the surface just upstream of the crest. It may be understood that the system shown in FIG. 1B could be re calibrated to allow the photosensors 26, 27, to be positioned "in the gaps" instead of at the crest points as shown, to allow the photosensors 26, 27 to provide dual functions of recognizing the leading edge of the packages and also to recognize when the packages leave the supporting surface upstream of the relevant crest. Alternately, a microswitch and a split belt conveyor could be used to recognize when the package is leaving the split conveyor.

It may be understood that if a "gap recognition" approach as discussed immediately above is used, the points B" and B' as shown in FIG. 5B would be approximated by the sensing process, instead of being approximated by the estimation algorithm discussed above. Therefore it may be seen that there are at least two different ways to approximate the time (and travel distance) it takes the packages such as shown in FIGS. 5A–5D to move from the positions shown in FIG. 5B to their stable positions shown in FIG. 5D, one being done by modeling, and one being done by actual sensing.

Conclusion

While this invention has been described in specific detail with reference to the disclosed embodiments, it will be understood that many variations and modifications may be effected within the spirit and scope of the invention as described in the appended claims.

What is claimed is:

1. A method for approximating the location of a gravity center point of a rectangular package having a substantially planar lower surface, said method comprising the steps of:

transferring said package across a conveyor having two nonparallel supporting surfaces meeting at an upwardly-directed crest such that said lower surface of said package is in contact with said crest;

approximating the instant at which said package becomes unstable and begins tilting away from contact with said first surface towards said second surface; and approximating the location of said gravity center by use of said instant approximation.

2. The method as claimed in claim 1, wherein said instant is approximated by estimating the time the package takes to rotate from said unstable position to a position contacting said second supporting surface.

3. The method as claimed in claim 1, wherein said instant is approximated by sensing when said lower surface of said package ceases to be in planar engagement with said first supporting surface.

4. An apparatus for approximating the three dimensional coordinates, namely the first, second, and third dimensional coordinates of the center of gravity of a package, comprising:

a herringbone conveyor for approximating said one dimensional coordinate of said three dimensional coordinates, a first pair of conveyors for tilting said package between said first conveyor pair from a first to a second orientation;

a second pair of conveyors for tilting said package between said second conveyor pair from said second orientation to a third orientation; and means for determining said second and third dimensional coordinates by comparing information observed during said tilting on said first and second conveyor pairs.

5. The apparatus as claimed in claim 4, wherein said first and second conveyor pairs share a common conveyor.

6. The apparatus as claimed in claim 4, wherein said first and second conveyor pairs comprise four separate conveyors.

7. An apparatus for approximating the location of a gravity center point of a rectangular package, comprising:

a first conveyor defining a first supporting surface capable of supporting the weight of said package;

a second conveyor defining a second supporting surface capable of supporting the weight of said package, said first and second supporting surfaces being in nonparallel planes and joined along an upwardly-directed peak, said first and second conveyor section configured to cooperate to allow said package to be conveyed from atop said first supporting surface to atop said second supporting surface such that said package tilts from contact with said first conveyor surface to contact with said second conveyor surface; and time sensing means for sensing the time difference between the time a selected point on said package passes over said peak to the time said package tilts over said peak and said selected point is in contact with said second supporting surface.

8. An apparatus for approximating the location of a gravity center point of a rectangular package having a substantially planar lower surface, comprising:

a first conveyor defining a first supporting surface capable of supporting the weight of said package;

a second conveyor defining a second supporting surface capable of supporting the weight of said package, said first and second supporting surfaces being in nonparallel planes and joined along an upwardly-directed peak, said first and second conveyor section configured to cooperate to allow said package to be conveyed from atop said first supporting surface to atop said second supporting surface such that said package tilts from contact with said first conveyor surface to contact with said second conveyor surface; and a sensor spaced from said peak for sensing when said package has tilted a predetermined angle from said original orientation toward said second orientation.

9. The apparatus as claimed in claim 8, wherein said second conveyor includes a pair side-by-side conveyor belts defining an intermediate longitudinal split therebetween, and wherein said sensor is a microswitch extending through said pair of conveyor belts of said second conveyor.

10. An apparatus for approximating the location of a gravity center point of a rectangular package having a substantially planar lower surface, comprising:

a first conveyor defining a first supporting surface capable of supporting the weight of said package;

a second conveyor defining a second supporting surface capable of supporting the weight of said package, said first and second supporting surfaces being in nonparallel planes and joined along an upwardly-directed peak, said first and second conveyor section configured to cooperate to allow said package to be conveyed from atop said first supporting surface to atop said second supporting surface such that said package tilts from contact with said first conveyor surface to contact with said second conveyor surface; and a sensor spaced from said peak for sensing when said package has tilted from said original orientation to said second orientation.

11. The apparatus as claimed in claim 10, wherein said second conveyor includes a pair side-by-side conveyor belts defining an intermediate longitudinal split therebetween, and wherein said sensor is a microswitch extending through said pair of conveyor belts of said second conveyor.

12. An apparatus for approximating at least one spacial coordinate of the center of gravity of a package when located at a measuring site, comprising:

a herringbone conveyor configured for urging said package from a first remote location to said measuring site, such that the center of gravity of said package is situated approximate the centerline of said herringbone conveyor when positioned in said measuring site, measuring means for measuring the distance between two substantially parallel sides of said package relative to said centerline, such that the package width and the location of the package's center of gravity along the width of said package is can be determined.

13. An apparatus for determining at least two outside dimensions of a rectangular package traveling at a known velocity, said package including first and second sides extending the length of said package, said apparatus comprising;

conveyor means for moving a package at said velocity along a path from a first to a second location;

first side sensor means for sensing the presence of said package's first side and the distance of said first side relative to a fast reference point;

second side sensor means for sensing the distance of said package's second side relative to a second reference point, said second reference point being at a known distance relative to said first reference point; and calculating means for determining the width of said package by use of said first and second side sensors and for also determining the length of said package by determining the distance traveled by said package between the point at which said first sensor senses the presence of said package to the point at which said first sensor no longer senses the side or said package.

* * * * *